Feb. 8, 1944.  H. C. SWERTFEGER  2,341,486
MOWING MACHINE
Filed March 19, 1942  2 Sheets-Sheet 1

INVENTOR.
Harold C. Swertfeger
BY
Victor J. Evans & Co.
ATTORNEYS

Feb. 8, 1944.   H. C. SWERTFEGER   2,341,486
MOWING MACHINE
Filed March 19, 1942   2 Sheets-Sheet 2
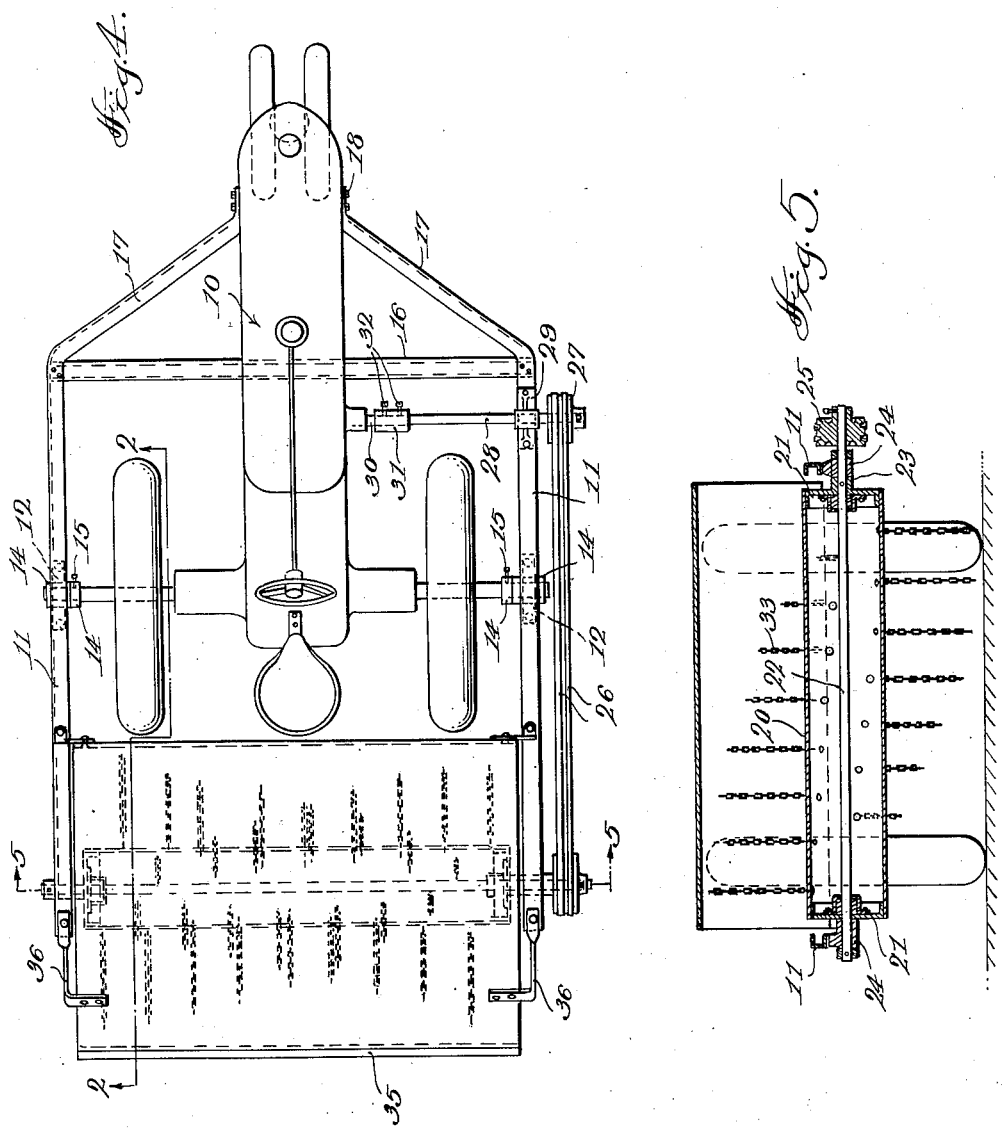
INVENTOR.
Harold C. Swertfeger
BY
Victor J. Evans & Co.
ATTORNEYS Patented Feb. 8, 1944

2,341,486

UNITED STATES PATENT OFFICE 2,341,486

MOWING MACHINE

Harold C. Swertfeger, Jarrett, Va.

Application March 19, 1942, Serial No. 435,412

4 Claims. (Cl. 56—26)

This invention relates to a mowing machine and has for an object to provide a device of this character especially adapted for use on power line rights of way, pastures etc. where a conventional mowing machine cannot be used because of obstructions such as stumps, rocks, sticks and large bushes.

An object of the invention is to provide a mowing machine which may be drawn by a tractor and includes a power driven cylinder equipped with chains attached in a spiral and staggered pattern extended by centrifugal force as the tractor is driven forward and tearing to shreds any growth over which the mowing machine passes, the chains yielding when solid objects such as stumps are encountered and passing over the same without breakage of the machine or slowing up the operation.

A further object is to provide a mowing machine of this type in which the staggered and spiral pattern of the chains places an equal portion of the cutters or chains in contact with the growth of vegetation at all times, resulting in an even load or resistance to the power unit in contrast to other arrangements of cutters such as cutters arranged in rows because such cutters cause the load or resistance to be exerted in jerks as all cutting members in any row will contact with the growth or weeds at one time, and then their is a let up or lightening of resistance until the next row of cutters come to contact position.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming a part of this specification:

Figure 4 is a top plan view of the mowing machine and tractor shown in Figure 1.

Figure 5 is a cross sectional view of the mowing machine taken on the line 5—5 of Figure 4, the chains being shown foreshortened wherever they are disposed at angular positions to a vertical plane through the axis of the cylinder.

Figure 3:
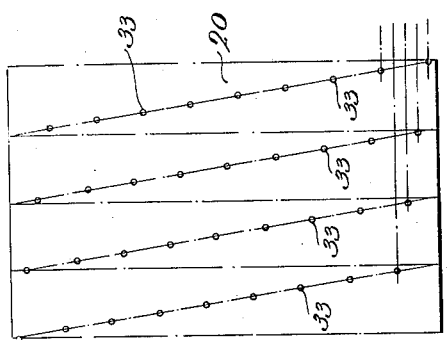
Figure 3 is a diagrammatic view showing the spiral and staggered pattern of the chains on the cylinder, the latter being shown flattened out.
Figure 1:
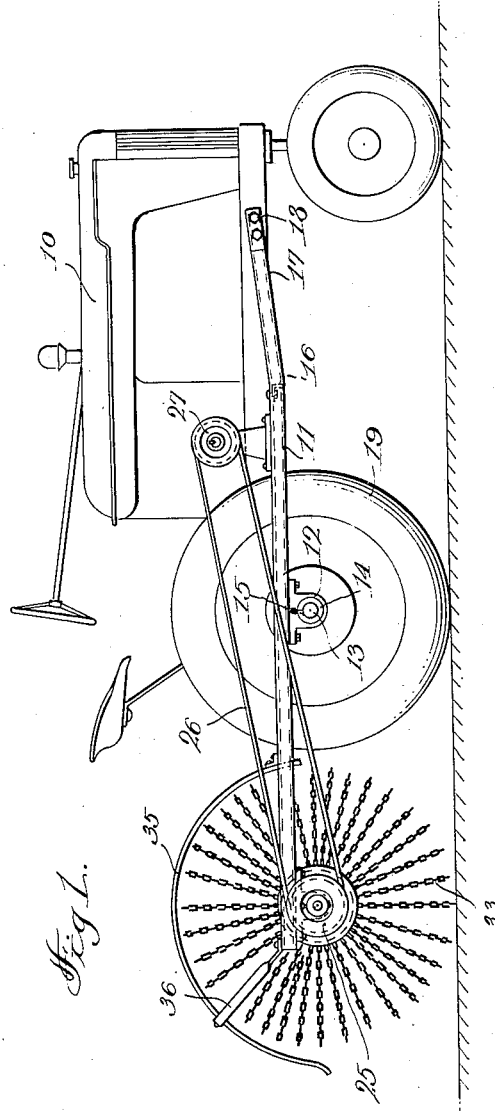
Figure 1 is a side elevation of a mowing machine constructed in accordance with the invention, attached to a tractor.

Referring now to the drawings in which like characters of reference designate similar parts in the various views, 10 designates a conventional tractor. In carrying out the invention, the mowing machine frame includes side members 11 which are provided between their ends with bearings 12 which are mounted on the tractor axles 13 betwen collars 14 secured in place by set screws 15. A front cross member 16 of the frame is secured at a point between its ends to the under side of the tractor. Inwardly and forwardly inclined front members 17 of the frame are secured at their front ends to the sides of the tractor by bolts 18 or other connectors. The side members 11 of the frame extend beyond the rear wheels 19 of the tractor, and support the cutter cylinder of the machine.

The cutter cylinder 20 is preferably formed of a hollow metal tube closed at the ends by flanged caps 21, see Figure 5. The cylinder is provided with an axial shaft 22 which is fixed to hubs 23 formed on the caps 21. The ends of the shaft project beyond the hubs and are received in bearings 24 secured to the bottom faces of the side members 11. One end of the shaft is equipped with a grooved pulley 25.

The cylinder is rotated through the medium of an endless drive comprising spaced belts 26 which are trained over a similar pulley 27 fixed to a shaft 28. The shaft 28 is journaled in a bearing 29 mounted on one of the side members 11 and the end of the shaft is secured to the power take-off shaft 30 of the tractor by a couping sleeve 31 having set screws 32 which engage the shaft 28 and the power take-off shaft 30.

The cutters are in the nature of chains 33 which are secured at the inner ends to the cylinder 20 by eye bolts 34, or other connectors. As shown diagrammatically in Figure 3 the chains are arranged in a staggered and spiral pattern around the cylinder. The advantage of this spiral pattern is that, when the chains are moved to extend radially from the cylinder by centrifugal force, due to rapid rotation of the cylinder, an equal portion of the cutters will contact with the growth of vegetation at all times, resulting in an even load or resistance to the power unit.

Figure 2:
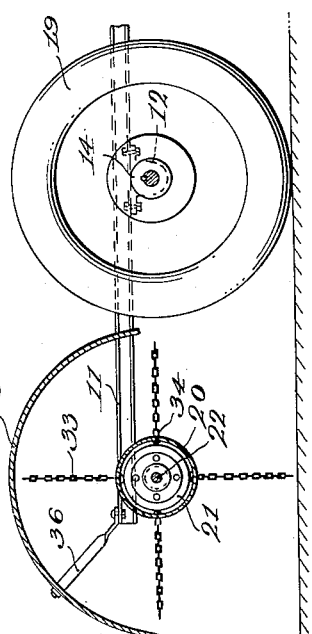
Figure 2 is a longitudinal sectional view taken on the line 2—2 of Figure 4, showing the cylinder, cutting chains, and guard for preventing flying particles striking the operator.

A semicylindrical guard 35 is secured to the rear ends of the side members 11 of the frame by bracket arms 36, and extends above the cylinder from end to end thereof, at such a distance from the cylinder that the chains may straighten out as shown by Figure 2. The guard protects the driver of the tractor from flying particles picked up by the chains.

From the above description it is thought that the construction and operation of the invention will be fully understood without further explanation.

What is claimed is:

1. A mowing machine comprising a frame having side members provided between their ends with bearings adapted to be mounted on the axles of a tractor, a front cross member connected to the side members and adapted to be secured at a point between the ends to the under side of the tractor, inwardly and forwardly inclined front members connected to the cross member and adapted to be secured to the sides of the tractor, said side members being of sufficient length to extend beyond the rear wheels of the tractor, a hollow cylinder having hubs at the ends received in bearings secured to the rear ends of said side members, an endless drive means connected to one of the hubs and adapted to be connected to the power take-off shaft of the tractor, and flexible cutting members arranged in spiral and staggered formation on the cylinder adapted to be thrown to radial position by centrifugal force when the cylinder is rotated to sever vegetation, the staggered and spiral pattern of the cutting members effecting an equal portion of the members to be in contact with the growth of vegetation at all times resulting in an even load or resistance to the power.

2. The structure as of claim 1 and in which said flexible cutting members comprise chains secured at their inner ends to the cylinder.

3. The structure as of claim 1 and in which said endless drive means comprises flexible belts engaged over a pulley on said hub, and over a pulley adapted to be coupled to the take-off shaft of the tractor.

4. An apparatus of the character described, a pair of side longitudinal frame members adapted for connection with a draft means, a pair of transversely aligned bearings carried by the respective side members, a transversely extending shaft having its ends journaled in the bearings, a hub fixedly secured on the shaft inwardly of each bearing, a disk shaped cap secured to the hub and disposed transversely of the axis of the shaft, an annular flange concentric with the shaft on the periphery of the cap, a rigid tube having each end embracing and fastened to one of the said flanges, the said tube having its circumferential wall concentric with and spaced from the shaft, a pulley fixed upon an extension at one end of the shaft for rotating the latter, and a plurality of lengths of chain secured to the tube, each of the said lengths of chain having an end extending through an aperture in the tube and fastened interiorly of the tube.

HAROLD C. SWERTFEGER.